United States Patent

Pucilowski et al.

Patent Number: 5,190,896
Date of Patent: Mar. 2, 1993

[54] CONTRAST ENHANCEMENT IN GLASS

[75] Inventors: Sally Pucilowski, Luzerne; David G. Krashkevich, Dallas; Ronald A. Klimek, Shavertown, all of Pa.

[73] Assignee: Schott Glass Technologies, Inc., Duryea, Pa.

[21] Appl. No.: 904,098

[22] Filed: Jun. 25, 1992

Related U.S. Application Data

[63] Continuation-in-part of Ser. No. 785,570, Oct. 30, 1991, abandoned, which is a continuation of Ser. No. 735,027, Jul. 22, 1991, abandoned.

[51] Int. Cl.$^5$ ............................................. C03C 3/095
[52] U.S. Cl. ........................................ 501/64; 501/903
[58] Field of Search ................................... 501/64, 903

[56] References Cited

U.S. PATENT DOCUMENTS

| | | | |
|---|---|---|---|
| 4,288,250 | 9/1981 | Yamashita | 501/78 |
| 4,376,829 | 3/1983 | Daiku | 501/64 |
| 4,390,637 | 6/1983 | Daiku | 501/64 |
| 4,769,347 | 9/1988 | Cook et al. | 501/64 |
| 5,039,631 | 8/1991 | Krashkevich et al. | 501/64 |
| 5,061,659 | 10/1991 | Ciolek et al. | 501/64 |

*Primary Examiner*—Mark L. Bell
*Assistant Examiner*—Deborah Jones
*Attorney, Agent, or Firm*—Millen, White, Zelano and Branigan

[57] ABSTRACT

A colored, chemstrengthenable contrast enhancement, UV attenuated glass (e.g., for sunglasses) comprises, in weight percent,

| Oxide | Wt. % |
|---|---|
| $SiO_2$ | 40–72 |
| $B_2O_3$ | 0–13 |
| $Al_2O_3$ | 0.5–3 |
| $Li_2O$ | 0–3 |
| $Na_2O$ | 8–13 |
| $K_2O$ | 1–10 |
| $TiO_2$ | 8.0–9.5 |
| $CeO_2$ | 2.6–3.5 |
| $Nd_2O_3$ | 5–17 |
| $Fe_2O_3$ | 1.40–2.10 |
| CoO | 0–0.07 |
| NiO | 0–0.4 |
| CuO | 0–0.5 |
| $Er_2O_3$ | 0–2 |
| $V_2O_5$ | 0–0.5 |
| $Cr_2O_3$ | 0–0.25 | and has the following properties
% T (2.0 mm) 400 nm: ≦2.2%
% T (2.0 mm) 380 nm: 0.0%
a: −1.0 to −7.5
b: +1.0 to +10.0.

20 Claims, No Drawings

CONTRAST ENHANCEMENT IN GLASS

CROSS-REFERENCE TO RELATED APPLICATIONS

This application is a continuation-in-part of U.S. Ser. No. 07/785,570, filed Oct. 30, 1991, now abandoned, which is a continuation of U.S. patent application Ser. No. 07/735,027, filed Jul. 22, 1991, now abandoned, both of which are entirely incorporated by reference herein.

BACKGROUND OF THE INVENTION

This invention relates to an improved contrast enhancement glass useful for ophthalmic applications such as sunglass lenses.

It is desired for many applications to enhance the contrast of target subjects with respect to background radiation. In addition, it is often desired to lower the amount of UV radiation transmitted through a given glass, e.g., for sunglasses, preferably to obtain 0% transmission up to a wavelength of 380 nm and in some cases, e.g., where UV radiation is especially harmful, up to and/or around 400 nm. While it has been possible to obtain either of these effects alone and, to a certain extent, both effects together, there still remains room for improvement, especially in glasses which can be colored in any desirable fashion, e.g., gray or brown in sunglasses. Of course, it is also desirable that, for ophthalmic and/or optical applications, the glass be capable of providing severe lens corrections (high index) and have a low density.

It is known that $Nd_2O_3$ can provide contrast enhancement due to its natural combination of absorption bands in the visible region. See, e.g., U.S. Pat. Nos. 4,769,347, 4,288,250, 4,521,524, 4,376,829, 4,405,881 and 4,390,637. In contrast enhancement glasses containing Nd, it is also desired that the radiation coming from a desired subject maintain the true color of the latter on passage through the glass and that the image of the subject be sharp. With such properties, the glass would be most useful plano or in prescription lenses.

Neodymium has also been added to various glasses for other purposes. See, e.g., U.S. Pat. Nos. 1,449,793 (coloring), 2,688,560 (coloring), 3,457,182 (lasing), 3,640,890 (lasing), and 4,093,468 (coloring of glass-ceramics). In addition, it is known to add colorants such as $CeO_2$, $Sm_2O_3$, $Fe_2O_3$, CoO, NiO, CuO, $Er_2O_3$, $MnO_2$, $V_2O_5$, $Cr_2O_3$, etc., for purposes of obtaining desired colors in silicate glasses, in various combinations. $CeO_2$ is also well known as a solarization inhibitor. See, e.g., U.S. Pat. Nos. 4,257,811, 3,495,964, 3,672,919 and 3,960,754, as well as many of the patents mentioned above. The ability of some of these colorants, as well as $TiO_2$, to absorb short wavelength radiation is also known in general. See, e.g., U.S. Pat. No. 4,521,524.

However, heretofore glass has not been provided fully satisfactorily combining all the various desirable characteristics including those mentioned above.

SUMMARY OF THE INVENTION

This invention relates to a glass composition achieving the characteristics described above, comprising in weight percent (batch basis),

| Oxide | Wt. % |
| --- | --- |
| $SiO_2$ | 40–72 |
| $B_2O_3$ | 0–13 |
| $Al_2O_3$ | 0.5–3 |
| $Li_2O$ | 0–3 |
| $Na_2O$ | 8–13 |
| $K_2O$ | 1–10 |
| $TiO_2$ | 8.0–9.5 |
| $CeO_2$ | 2.6–3.5 |
| $Nd_2O_3$ | 5–17 |
| $Fe_2O_3$ | 1.40–2.10 |
| CoO | 0–0.07 |
| NiO | 0–0.4 |
| CuO | 0–0.5 |
| $Er_2O_3$ | 0–2 |
| $V_2O_5$ | 0–0.5 |
| $Cr_2O_3$ | 0–0.25 | the amounts of, e.g., $TiO_2$, $CeO_2$, and $Fe_2O_3$ being chosen in accordance with this invention to achieve a desired combination of UV and color properties.

For the gray colored glasses of this invention, the following compositions are preferred:

| Oxide | Preferred | Most Preferred |
| --- | --- | --- |
| $SiO_2$ | 45–65 | 48–60 |
| $B_2O_3$ | 0.5–5 | 0.5–2.5 |
| $Al_2O_3$ | 0.5–2.5 | 0.5–1.5 |
| $Li_2O$ | 1–2.5 | 1.5–2.5 |
| $Na_2O$ | 8–11.5 | 8–10.5 |
| $K_2O$ | 1–8.5 | 1–7.5 |
| $TiO_2$ | 8.0–9.5 | 8.5–9.0 |
| $CeO_2$ | 2.6–3.5 | 2.8–3.0 |
| $Nd_2O_3$ | 5–16 | 9–15.5 |
| $Fe_2O_3$ | 1.40–2.10 | 1.6–1.8 |
| CoO | 0.01–0.06 | 0.01–0.05 |
| NiO | 0.01–0.1 | 0.01–0.06 |
| CuO | 0.01–0.25 | 0.01–0.05 |
| $Er_2O_3$ | 0–1 | 0–0.5 |
| $V_2O_5$ | 0–0.25 | 0–0.05 |
| $Cr_2O_3$ | 0–0.1 | 0–0.01 |

The colorants per se generally have the following nominal hues: NiO (brown), CoO (blue), $V_2O_5$ (green), $Cr_2O_3$ (lime green), CuO (blue-blue green) and $Er_2O_3$ (pink). $Nd_2O_3$ also imparts color (purpole). It is also possible for other colorants to be included in the glass of this invention depending upon the desired end color, e.g., $MnO_2$ in amounts of 0–0.5 wt. %, preferably 0–0.25 wt. % and most preferably 0–0.10 wt. %.

Furthermore, in addition to the components listed above, it is possible to include in the glasses of this invention conventional RO's such as CaO, MgO and ZnO in small amounts, e.g., 0–2 wt. %, preferably 0–1 wt. % or 0–0.5 wt. %; most preferably there are essentially no alkaline earth metal oxides. When included, these components improve the chemical durability of the glass but hinder its chemstrengthenability, except generally for ZnO. Small amounts of these ingredients effect large differences in glass color. $ZrO_2$ can also be included in the same amounts. At higher levels, adverse effects on color properties occur.

$La_2O_3$ can be substituted on an ion for ion basis for $Nd_2O_3$ in the glasses of this invention, as usual. Thus, for any given $Nd_2O_3$-containing glass of this invention, up to 12 wt. % $Nd_2O_3$ can be replaced by $La_2O_3$ where less $Nd_2O_3$ is required, thus keeping the rare earth level constant in the composition.

A key feature of the glass of this invention is the combination of $TiO_2$ and $CeO_2$ in the amounts given above. Together, along with the aid of $Fe_2O_3$ in the stated amounts, they provide highly desirable UV attenuation, e.g., in a 2.0 mm thick lens, it is possible to achieve with these ingredients the following UV attenuation characteristics: 380 nm - 0% T; 390 nm - $\leq 0.5\%$ T; 400 nm - $\leq 2.2\%$ T, with at most, a few routine parametric experiments, such as those shown in Examples 14, 15, A and 16 ($CeO_2$ and $Fe_2O_3$ constant, $TiO_2$ varied), Examples 14, B, 17, C and 18 ($TiO_2$ and $Fe_2O_3$ constant, $CeO_2$ varied), and Examples 14, 19, D and 20 ($TiO_2$ and $CeO_2$ constant, $Fe_2O_3$ varied). As can be seen, as the end points for these components are approached within the invention, the desired UV and/or color properties fall off. A preferred UV spec is: 400 nm $\leq 2.0\%$ T, 390 nm $\leq 0.5\%$ T and 380 nm = 0% T.

With respect to UV attenuation, it is also possible to employ conventional UV attenuation surface coatings to the glass to reduce its overall UV attenuation where desired, e.g., to a value of 0% T also at 390 nm and 400 nm. However, this is less preferred since a major advantage of the glasses of this invention is that they are UV attenuated to a high degree without coatings. The nature of and methods of applying such coatings are conventional.

Preferably, the amounts of $CeO_2$ and $TiO_2$ will be contained in a weight ratio of approximately 1:3 (Ce:Ti); more generally this preferred ratio can be 1:2.4 to 1:3.4.

If the amounts of $TiO_2$, $CeO_2$ or $Fe_2O_3$ are higher or lower than the prescribed composition and ratio ranges, then undesirable UV attenuation and/or color space will be achieved. If the amount of $TiO_2$ is greater than prescribed, the index of the glass increases and the broad band absorption of the $TiO_2$ adversely affects the desired color properties. If too little $TiO_2$ is present, then the UV attenuation of the glass suffers. If the amount of $CeO_2$ is greater than prescribed, production problems ensue and desired color properties degrade. If too little $CeO_2$ is present, the UV attenuation of the glass suffers. If the amount of $Fe_2O_3$ is greater than prescribed, the desired color properties are not achieved. If too little $Fe_2O_3$ is present, both color and UV attenuation properties suffer.

Surprisingly, all of these components in the proper amounts, enable a ready achievement of desired UV and color space properties (a and b values, for instance) with not more than routine experimentation. A further advantage of this invention is the high $n_D$ and low density of the glasses. These properties are especially important for prescription lenses.

$SiO_2$, of course, is a primary network former. $B_2O_3$ is employed to aid in melting. Since the glass is preferably tank produced, too high a $B_2O_3$ content can lead to inordinate dissolution of the tank refractory material, causing deleterious inclusion problems and severe tank wear.

$Al_2O_3$ is contained for the increased durability it provides the glass. If too much $Al_2O_3$ is included, difficulties in melting ensue. The alkali metal oxides enhance meltability of the glass. The amount of $Na_2O$ is increased with respect to those of $Li_2O$ and $K_2O$ in order to enhance chemstrengthenability. Too high amounts of $K_2O$ would deleteriously affect this property. In addition, too high a $Li_2O$ content could produce unacceptable bulk glass crystallization.

$Nd_2O_3$ is the primary contrast enhancement component. Amounts under 5 wt. % provide insufficient contrast, whereas amounts over 17 wt. % are superfluous for either color or enhancement purposes.

Surprisingly, the colorants described above can be employed in essence in any amounts and in any combinations which provide the desired color as long as the important glass properties are not deleteriously affected. In a preferred aspect for a gray glass, cobalt, nickel and copper will be included in amounts of 0.01–0.06, 0.01–0.4 and 0.01–0.50, respectively, and the other colorants will be optional. In another preferred aspect, less or no cobalt and copper will be included to produce brown glasses. The colorant $Er_2O_3$ can also have beneficial effect on contrast enhancement due to its absorption in certain spectral ranges.

Each component of the glasses of this invention can be varied within its prescribed range, the latter being alternatively definable by narrower subsumed ranges, e.g., wherein one or both range endpoints vary from the endpoints mentioned above by increments of 0.01, 0.1, 0.5, etc.

The glasses of this invention can be chemstrengthened or air hardened using very well known procedures. They can be employed (e.g., shaped, ground and polished) as sunglass lenses similarly fully conventionally by standard mounting in suitable eyeglass frames.

Preferred properties for the glass of this invention include:

|  | General | Preferred | Most Preferred |
|---|---|---|---|
| Photopic % T (2 mm) | 15–30 | 15–27 | 15–23 |
| $-a$ | −1.0 to −7.5 | −2.5 to −7.5 | −4.5 to −6.5 |
| b | +1.0 to +10.0 | +1.5 to +6.5 | +3.5 to +5.5 |

The color properties are defined fully conventionally using Hunter coordinates a (or $a_L$) and b (or $b_L$) which is related to the conventional CIE system in known fashion. (See, *Color Science* by Güunter Wyszecki and W. S. Stiles, C. 1967 CIE and chromaticity coordinates, page 279 and L, a and b page 460, inter alia). These are related to the conventional CIE color scale parameters X, Y, Z by:

CIE Color Scale $$\bar{Y} = \int_{380}^{750} y_\lambda H_\lambda R_\lambda \, d\lambda$$

$$\bar{X} = \int_{380}^{750} x_\lambda H_\lambda R_\lambda \, d\lambda$$

$$\bar{Z} = \int_{380}^{750} z_\lambda H_\lambda R_\lambda \, d\lambda$$

X (red), Y (green) and Z (blue) are called the tristimulus values.

R = ratio of diffuse light from a sample to that of a perfect diffuser $\bar{y}, \bar{x}, \bar{z}$ = conventional response curves of a standard observer.

H = Illuminant A, B, or C.

Chromaticity Coordinates $$y = \frac{Y}{X + Y + Z}$$

$$x = \frac{X}{X + Y + Z}$$

$$z = \frac{Z}{X + Y + Z}$$

$$x + y + z = 1$$

For example, if X=8, Y=48, Z=24, then X+Y+Z=80 and $$x = 8/80 = 0.1$$
$$y = 48/80 = 0.6$$
$$z = 24/80 = 0.3$$
$$L = 10\, Y^{\frac{1}{2}}$$

$$a_L = \frac{17.5(1.02X - Y)}{Y^{\frac{1}{2}}}$$

$$b_L = \frac{7.0(Y - 0.8467\, Z)}{Y^{\frac{1}{2}}}$$

A preferred range for Y is 15–24%. Chromaticity coordinates (a+b) are established by aesthetic considerations.

When the glasses of this invention are employed as contrast enhancement eyeglass lenses, e.g., for sunglasses, they are preferably shaped conventionally into a suitable form for use and conventionally combined with typical eyeglass frames. If the glasses are employed as contrast enhancement filters for other applications, similar processing will be employed in conjunction with the desired shapes.

The glass of this invention can be provided in any desirable shape using conventional molding procedures well known in the glass industry. In view of the unique combination of ingredients given above, the glasses of this invention can be very well chemstrengthened using conventional techniques such as those mentioned in Stroud, *Glass Technology*, Vol. 29, No. 3, June 1988, 108–114. Typically, a crown-bath solution can be used, e.g., 99.5% $KNO_3$ and 0.5% silicic acid, at a temperature in the range of about 430°–470° C. for an exchange time of, e.g., 16 hours. Typically, a preferred exchange temperature will be approximately 30° lower than the strain temperature of the glass. The determination of optimum chemstrengthening layer thicknesses can be effected routinely. Typically, acceptable thicknesses of a chemstrengthened layer will be above 30 μm, preferably about 50 μm; however, narrower and larger thicknesses are fully included. Typical surface compression values achievable for these glasses are about (1300–1500) nm/cm (birefringence).

Given the guidance of this application, it is possible to develop other glass colors retaining the desirable UV properties described above, e.g., brown glasses. See, e.g., Examples J, K and 22.

Example J eliminates the CuO and CoO of Example 14 and increases the NiO by 0.113 wt. %. The visual transmission is quite light. Example K has a 20% increase in all the colorants ($Nd_2O_3$, $Fe_2O_3$ and NiO). The resulting visual is still light for sunglass quality. Example 22 contains a 66% increase in all the colorants, and the composition is renormalized to total 100%. This melt produces a glass having a pleasing brown color.

The glasses of this invention can be prepared routinely by using normal batch components corresponding to the above-mentioned compositions, followed by conventional melting in an appropriate crucible, e.g., a platinum or quartz crucible, e.g., at melt temperatures of, for example, 1300°–1450° C.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosure of all applications, patents and publications, cited above and below, are hereby incorporated by reference.

EXAMPLES

For Example 10 of the Table, typical properties include:

| | |
|---|---|
| Density (g/cc) | 2.84 |
| CTE × $10^{-7}$ °C.$^{-1}$ (20–300° C.) | 94 |
| $T_g$ (°C.) | 507 |
| $T_{soft}$ (°C.) | 650 |
| $n_D$ | 1.593 |
| $v_D$ | 43.7 |
| % T @ 400 nm (2.0 mm) | 1.7 |
| % T @ 390 nm (2.0 mm) | 0.3 |
| % T @ 380 nm (2.0 mm) | 0.0 |
| −a | −5.62 |
| b | +5.25 |
| Chemstrengthening | |
| Salt bath - Crown bath (99.5% $KNO_3$, 0.5% Silicic Acid) | |
| Temperature (°C.) | 450 |
| Time (hours) | 16 |
| Depth of Layer (μm) | 50 |
| Compression (nm/cm) | 1,300 |

The glass has also been successfully air hardened by the conventional process.

All examples displayed % T@380 nm (2.0 mm)=0.0. All examples are gray in daylight; example 22 is brown in daylight.

EXAMPLE TABLE

| Oxides | 1 | 2 | 3 | 4 | 5 | 6 | 7 | 8 | 9 | 10 | 11 | 12 | 13 |
|---|---|---|---|---|---|---|---|---|---|---|---|---|---|
| $SiO_2$ | 49.27 | 49.27 | 49.27 | 49.27 | 49.27 | 49.27 | 49.27 | 49.27 | 49.27 | 57.52 | 57.77 | 57.77 | 57.77 |
| $B_2O_3$ | 10.27 | 10.47 | 10.47 | 10.47 | 10.47 | 10.47 | 10.47 | 10.47 | 10.47 | 1.49 | 1.50 | 1.50 | 1.50 |
| $Al_2O_3$ | 0.81 | 0.81 | 0.81 | 0.81 | 0.81 | 0.81 | 0.81 | 0.81 | 0.81 | 1.27 | 1.28 | 1.28 | 1.28 |
| $Li_2O$ | 2.44 | 2.44 | 2.44 | 2.44 | 2.44 | 2.44 | 2.44 | 2.44 | 2.44 | 2.43 | 2.44 | 2.44 | 2.44 |
| $Na_2O$ | 9.74 | 9.74 | 9.74 | 9.74 | 9.74 | 9.74 | 9.74 | 9.74 | 9.74 | 9.70 | 9.74 | 9.74 | 9.74 |
| $K_2O$ | 2.44 | 2.44 | 2.44 | 2.44 | 2.44 | 2.44 | 2.44 | 2.44 | 2.44 | 2.44 | 2.44 | 2.44 | 2.44 |
| $TiO_2$ | 8.52 | 8.52 | 8.52 | 8.52 | 8.52 | 8.52 | 8.52 | 8.52 | 8.52 | 8.48 | 8.52 | 8.52 | 8.52 |
| $CeO_2$ | 2.84 | 2.84 | 2.84 | 2.84 | 2.84 | 2.84 | 2.84 | 2.84 | 2.84 | 2.83 | 2.84 | 2.84 | 2.84 |
| $Nd_2O_3$ | 11.04 | 11.04 | 11.04 | 11.04 | 11.04 | 12.14 | 12.14 | 12.14 | 12.14 | 12.09 | 12.14 | 12.14 | 12.14 |

EXAMPLE TABLE (continued)

| | | | | | | | | | | | | | |
|---|---|---|---|---|---|---|---|---|---|---|---|---|---|
| Fe₂O₃ | — | 0.375 | 0.75 | 0.40 | 0.40 | 0.44 | 0.64 | 0.64 | 0.64 | 1.63 | 1.89 | 1.89 | 1.64 |
| CoO | 0.025 | 0.025 | 0.025 | 0.028 | 0.030 | 0.033 | 0.036 | 0.037 | 0.037 | 0.037 | 0.037 | 0.038 | 0.037 |
| NiO | 0.039 | 0.039 | — | 0.039 | 0.039 | 0.043 | 0.043 | 0.043 | 0.043 | 0.043 | 0.021 | 0.021 | 0.040 |
| CuO | — | — | — | 0.05 | 0.025 | 0.028 | 0.032 | 0.042 | 0.042 | 0.042 | 0.042 | 0.042 | 0.040 |
| KHF₂ | 1.95 | 1.95 | 1.95 | 1.95 | 1.95 | 1.95 | 1.95 | 1.95 | 1.95 | 1.95 | 1.95 | 1.95 | 1.95 |
| NH₄Cl | 0.41 | 0.41 | 0.41 | 0.41 | 0.41 | 0.41 | 0.41 | 0.41 | 0.41 | 0.41 | 0.41 | 0.41 | 0.41 |
| % T @ 400 nm (2 mm) | 2.1 | 1.5 | 1.3 | 1.3 | 1.3 | 1.3 | 1.1 | 1.0 | 1.1 | 1.7 | 1.4 | 1.1 | 1.6 |
| Visual (photopic) (2 mm) | 29.8 | 28.6 | 29.4 | 26.1 | 26.4 | 24.2 | 22.8 | 22.6 | 22.6 | 20.7 | 21.2 | 19.8 | 20.7 |
| a | −3.02 | −3.07 | −3.21 | −6.88 | −5.41 | −5.03 | −4.77 | −5.92 | −5.52 | −5.62 | −5.69 | −5.28 | −5.42 |
| b | 5.21 | 7.58 | 7.53 | 6.22 | 5.91 | 5.49 | 5.07 | 6.15 | 5.11 | 5.25 | 5.67 | 7.43 | 5.82 |

| Oxides | 14 | 15 | A | 16 | B | 17 | C | 18 | 19 | D | 20 | E | F |
|---|---|---|---|---|---|---|---|---|---|---|---|---|---|
| SiO₂ | 57.77 | 56.77 | 58.77 | 58.27 | 56.34 | 57.07 | 58.47 | 58.07 | 57.27 | 58.27 | 58.02 | 56.68 | 58.26 |
| B₂O₃ | 1.50 | 1.50 | 1.50 | 1.50 | 1.50 | 1.50 | 1.50 | 1.50 | 1.50 | 1.50 | 1.50 | 1.49 | 1.49 |
| Al₂O₃ | 1.28 | 1.28 | 1.28 | 1.28 | 1.28 | 1.28 | 1.28 | 1.28 | 1.28 | 1.28 | 1.28 | 1.28 | 1.28 |
| Li₂O | 2.44 | 2.44 | 2.44 | 2.44 | 2.44 | 2.44 | 2.44 | 2.44 | 2.44 | 2.44 | 2.44 | 2.43 | 2.43 |
| Na₂O | 9.74 | 9.74 | 9.74 | 9.74 | 9.74 | 9.74 | 9.74 | 9.74 | 9.74 | 9.74 | 9.74 | 9.70 | 9.72 |
| K₂O | 2.44 | 2.44 | 2.44 | 2.44 | 2.44 | 2.44 | 2.44 | 2.44 | 2.44 | 2.44 | 2.44 | 1.41 | 3.77 |
| TiO₂ | 8.52 | 9.52 | 7.52 | 8.02 | 8.52 | 8.52 | 8.52 | 8.52 | 8.52 | 8.52 | 8.52 | 10.48 | 6.49 |
| CeO₂ | 2.84 | 2.84 | 2.84 | 2.84 | 4.27 | 3.54 | 2.14 | 2.54 | 2.84 | 2.84 | 2.84 | 2.82 | 2.82 |
| Nd₂O₃ | 12.14 | 12.14 | 12.14 | 12.14 | 12.14 | 12.14 | 12.14 | 12.14 | 12.14 | 12.14 | 12.14 | 12.08 | 12.09 |
| Fe₂O₃ | 1.64 | 1.64 | 1.64 | 1.64 | 1.64 | 1.64 | 1.64 | 1.64 | 2.14 | 1.14 | 1.39 | 1.64 | 1.64 |
| CoO | 0.037 | 0.037 | 0.037 | 0.037 | 0.037 | 0.037 | 0.037 | 0.037 | 0.037 | 0.037 | 0.037 | 0.037 | 0.037 |
| NiO | 0.043 | 0.043 | 0.043 | 0.043 | 0.043 | 0.043 | 0.043 | 0.043 | 0.043 | 0.043 | 0.043 | 0.043 | 0.043 |
| CuO | 0.042 | 0.042 | 0.042 | 0.042 | 0.042 | 0.042 | 0.042 | 0.042 | 0.042 | 0.042 | 0.042 | 0.042 | 0.042 |
| KHF₂ | 1.95 | 1.95 | 1.95 | 1.95 | 1.95 | 1.95 | 1.95 | 1.95 | 1.95 | 1.95 | 1.95 | 1.95 | 1.95 |
| NH₄Cl | 0.41 | 0.41 | 0.41 | 0.41 | 0.41 | 0.41 | 0.41 | 0.41 | 0.41 | 0.41 | 0.41 | 0.41 | 0.41 |
| % T @ 400 nm (2 mm) | 1.7 | 0.8 | 2.8 | 2.1 | 0.20 | 0.6 | 3.3 | 2.3 | 0.7 | 2.8 | 2.0 | 0.4 | 5.9 |
| % T @ 390 nm (2 mm) | 0.3 | 0.1 | 0.7 | 0.4 | 0 | 0.1 | 0.9 | 0.5 | 0.1 | 0.7 | 0.4 | 0.1 | 1.9 |
| % T @ 380 nm (2 mm) | 0.0 | 0 | 0 | 0 | 0 | 0 | 0.1 | 0 | 0 | 0 | 0 | 0.0 | 0.4 |
| Visual (2.0) | 20.7 | 19.8 | 21.2 | 20.7 | 18.0 | 19.3 | 21.6 | 21.2 | 19.0 | 21.9 | 21.2 | 19.8 | 22.3 |
| DWL | 558 | 564 | 509 | 542 | 568 | 564 | 510 | 535 | 568 | 498 | 533 | 569 | 488.8 |
| % Purity | 9 | 16 | 3.5 | 5.2 | 26 | 16 | 3 | 4 | 21.5 | 5.1 | 4.2 | 28 | 8.5 |
| a | −5.62 | −6.28 | −5.79 | −5.65 | −6.58 | −6.39 | −4.83 | −5.56 | −5.38 | −5.73 | −6.07 | −6.70 | −5.54 |
| b | 5.25 | 7.87 | 1.67 | 3.41 | 11.25 | 8.23 | 1.38 | 2.94 | 9.89 | 0.20 | 3.09 | 12.71 | −2.78 |
| Ce:Ti (wt. %) | 1:3.0 | 1:3.4 | 1:2.6 | 1:2.8 | 1:2 | 1:2.4 | 1:4 | 1:3.4 | 1:3 | 1:3 | 1:3 | 1:3.7 | 1:2.3 |

| Oxides | G | 21 | H | I | J | K | 22 |
|---|---|---|---|---|---|---|---|
| SiO₂ | 59.30 | 57.77 | 57.99 | 58.23 | 57.77 | 57.77 | 55.57 |
| B₂O₃ | 1.49 | 1.50 | 1.50 | 1.51 | 1.50 | 1.50 | 1.44 |
| Al₂O₃ | 1.28 | 1.28 | 1.29 | 1.29 | 1.28 | 1.28 | 1.24 |
| Li₂O | 2.43 | 2.44 | 2.44 | 2.45 | 2.44 | 2.44 | 2.35 |
| Na₂O | 9.73 | 9.74 | 9.78 | 9.82 | 9.74 | 9.74 | 9.37 |
| K₂O | 4.94 | 2.44 | 3.23 | 3.75 | 2.44 | 2.44 | 2.35 |
| TiO₂ | 4.25 | 8.52 | 8.54 | 8.58 | 8.52 | 8.52 | 8.19 |
| CeO₂ | 2.83 | 2.84 | 1.41 | 0.50 | 2.84 | 2.84 | 2.73 |
| Nd₂O₃ | 12.11 | 12.14 | 12.17 | 12.22 | 12.06 | 15.07 | 11.60 |
| Fe₂O₃ | 1.64 | 1.64 | 1.65 | 1.66 | 1.64 | 2.05 | 2.63 |
| CoO | 0.037 | 0.037 | 0.037 | 0.037 | | | |
| NiO | 0.043 | 0.043 | 0.043 | 0.043 | 0.156 | 0.195 | 0.249 |
| CuO | 0.042 | 0.042 | 0.042 | 0.042 | | | |
| KHF₂ | 1.95 | 1.95 | 1.95 | 1.95 | 1.95 | 1.95 | 1.88 |
| NH₄Cl | 0.41 | 0.41 | 0.41 | 0.41 | 0.41 | 0.41 | 0.40 |
| % T @ 400 nm (2 mm) | 14.9 | 1.7 | 3.7 | 6.6 | 0.3 | 0.2 | 0.1 |
| % T @ 390 nm (2 mm) | 7.0 | 0.3 | 1.4 | 3.3 | 0.0 | 0.0 | 0.0 |
| % T @ 380 nm (2 mm) | 2.1 | 0.0 | 0.3 | 1.2 | 0.0 | 0.0 | 0.0 |
| Visual (2.0) | 23.2 | 20.7 | 18.7 | N/A | 32.4 | 28.0 | 16.8 |
| DWL | 481.5 | 558 | 556 | 531 | 579 | 581 | 583 |
| % Purity | 19.1 | 9 | 7.3 | 2.7 | 62 | 63 | 77 |
| a | −3.50 | −5.62 | −4.59 | −3.66 | +2.73 | +5.88 | +8.85 |
| b | −10.9 | 5.25 | 4.10 | 1.82 | +26.82 | +26.93 | +24.28 |
| Ce:Ti (wt. %) | 1:1.5 | 1:3.0 | 1:6.1 | 1:17.2 | 1:3.0 | 1:3.0 | 1:3.0 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A glass composition consisting essentially of

| Oxide | Wt. % |
|---|---|
| SiO$_2$ | 40–72 |
| B$_2$O$_3$ | 0–13 |
| Al$_2$O$_3$ | 0.5–3 |
| Li$_2$O | 0–3 |
| Na$_2$O | 8–13 |
| K$_2$O | 1–10 |
| TiO$_2$ | 8.0–9.5 |
| CeO$_2$ | 2.6–3.5 |
| Nd$_2$O$_3$ | 5–17 |
| Fe$_2$O$_3$ | 1.40–2.10 |
| CoO | 0–0.07 |
| NiO | 0–0.4 |
| CuO | 0–0.5 |
| Er$_2$O$_3$ | 0–2 |
| V$_2$O$_5$ | 0–0.5 |
| Cr$_2$O$_3$ | 0–0.25 | and having the following properties
%T (2.0 mm) 400 nm: ≦2.2%
%T (2.0 mm) 380 nm: 0.0%, and
a: −1.0 to −7.5
b: +1.0 to +10.0.

2. A glass of claim 1, wherein the TiO$_2$, CeO$_2$ and Fe$_2$O$_3$ contents are

| TiO$_2$ | 8.5–9.0 |
|---|---|
| CeO$_2$ | 2.8–3.0 |
| Fe$_2$O$_3$ | 1.6–1.8 | and further having

%T (2.0 mm) 390 mm: ≦0.5

3. A glass of claim 2, wherein the amount of CoO is 0.01–0.06 wt. %; of NiO is 0.01–0.4 wt. %; and of CuO is 0.01–0.5 wt. %.

4. A glass of claim 1, consisting essentially of the following composition:

| Oxide | Wt. % |
|---|---|
| SiO$_2$ | 45–65 |
| B$_2$O$_3$ | 0.5–5 |
| Al$_2$O$_3$ | 0.5–2.5 |
| Li$_2$O | 1–2.5 |
| Na$_2$O | 8–11.5 |
| K$_2$O | 1–8.5 |
| TiO$_2$ | 8.0–9.5 |
| CeO$_2$ | 2.6–3.5 |
| Nd$_2$O$_3$ | 5–16 |
| Fe$_2$O$_3$ | 1.40–2.10 |
| CoO | 0.01–0.06 |
| NiO | 0.01–0.1 |
| CuO | 0.01–0.25 | and having the following properties:
%T (2.0 mm) 400 nm: ≦2.0%
%T (2.0 mm) 390 nm: ≦0.5
%T (2.0 mm) 380 nm: 0.0%
a: −2.5 to −7.5
b: +1.5 to +6.5.

5. A glass of claim 1, consisting essentially of the following composition:

| Oxide | Wt. % |
|---|---|
| SiO$_2$ | 48–60 |
| B$_2$O$_3$ | 0.5–2.5 |
| Al$_2$O$_3$ | 0.5–1.5 |
| Li$_2$O | 1.5–2.5 |
| Na$_2$O | 8–10.5 |
| K$_2$O | 1–7.5 |
| TiO$_2$ | 8.5–9.0 |
| CeO$_2$ | 2.8–3.0 |
| Nd$_2$O$_3$ | 9–15.5 |
| Fe$_2$O$_3$ | 1.6–1.8 |
| CoO | 0.01–0.05 |
| NiO | 0.01–0.06 |
| CuO | 0.01–0.05 | and having the following properties:
%T (2.0 mm) 400 nm: ≦2.0%
%T (2.0 mm) 390 nm: ≦0.5
%T (2.0 mm) 380 nm: 0.0%
a: −4.5 to −6.5
b: +3.5 to +5.5.

6. A glass of claim 1, wherein the weight ratio of Ce:Ti is 1:2.4 to 1:3.4.

7. A glass of claim 2, wherein the weight ratio of Ce:Ti is 1:2.4 to 1:3.4.

8. A glass of claim 1 which has at least one chemstrengthened surface.

9. A colored sunglass lens having low UV transmission consisting essentially of a glass of claim 1.

10. A colored sunglass lens having low UV transmission consisting essentially of a glass of claim 3.

11. A lens of claim 10 having at least one surface chemstrengthened.

12. A sunglass combination comprising a sunglass frame and a sunglass lens of claim 9.

13. A lens of claim 9, wherein said glass has a composition:

| Oxide | Wt. % |
|---|---|
| SiO$_2$ | 45–65 |
| B$_2$O$_3$ | 0.5–5 |
| Al$_2$O$_3$ | 0.5–2.5 |
| Li$_2$O | 1–2.5 |
| Na$_2$O | 8–11.5 |
| K$_2$O | 1–8.5 |
| TiO$_2$ | 8.0–9.5 |
| CeO$_2$ | 2.6–3.5 |
| Nd$_2$O$_3$ | 5–13 |
| Fe$_2$O$_3$ | 1.40–2.10 |
| CoO | 0.01–0.05 |
| NiO | 0.01–0.1 |
| CuO | 0.01–0.25 | and having the following properties:
%T (2.0 mm) 400 nm: ≦2.0%
%T (2.0 mm) 390 nm: ≦0.5
%T (2.0 mm) 380 nm: 0.0%
a: −2.5 to −7.5
b: +1.5 to +6.5.

14. A lens of claim 9, wherein said glass has a composition:

| Oxide | Wt. % |
|---|---|
| SiO$_2$ | 48–60 |
| B$_2$O$_3$ | 0.5–2.5 |
| Al$_2$O$_3$ | 0.5–1.5 |
| Li$_2$O | 1.5–2.5 |

-continued

| Oxide | Wt. % |
|---|---|
| Na$_2$O | 8–10.5 |
| K$_2$O | 1–7.5 |
| TiO$_2$ | 8.5–9.0 |
| CeO$_2$ | 2.8–3.0 |
| Nd$_2$O$_3$ | 9–12.5 |
| Fe$_2$O$_3$ | 1.6–1.8 |
| CoO | 0.01–0.04 |
| NiO | 0.01–0.05 |
| CuO | 0.01–0.05 | and having the following properties:
% T (2.0 mm) 400 nm: ≦2.0%
% T (2.0 mm) 390 nm: ≦0.5
% T (2.0 mm) 380 nm: 0.0%
a: −4.5 to −6.5
b: +3.5 to +5.5.

15. A glass of claim 1, consisting essentially of the following compositions:

| Oxide | Wt. % |
|---|---|
| SiO$_2$ | 45–65 |
| B$_2$O$_3$ | 0.5–5 |
| Al$_2$O$_3$ | 0.5–2.5 |
| Li$_2$O | 1–2.5 |
| Na$_2$O | 8–11.5 |
| K$_2$O | 1–8.5 |
| TiO$_2$ | 8.0–9.5 |
| CeO$_2$ | 2.6–3.5 |
| Nd$_2$O$_3$ | 5–16 |
| Fe$_2$O$_3$ | 1.40–2.10 |
| CoO | 0–0.02 |
| NiO | 0.1–0.3 |
| CuO | 0–0.02 |
| Er$_2$O$_3$ | 0–0.5 |
| V$_2$O$_5$ | 0–0.25 |
| Cr$_2$O$_3$ | 0–0.1. |

16. A glass of claim 1, consisting essentially of the following compositions:

| Oxide | Wt. % |
|---|---|
| SiO$_2$ | 48–60 |
| B$_2$O$_3$ | 0.5–2.5 |
| Al$_2$O$_3$ | 0.5–1.5 |
| Li$_2$O | 1.5–2.5 |
| Na$_2$O | 8–10.5 |
| K$_2$O | 1–7.5 |
| TiO$_2$ | 8.5–9.0 |
| CeO$_2$ | 2.8–3.0 |
| Nd$_2$O$_3$ | 9–15.5 |
| Fe$_2$O$_3$ | 1.6–1.8 |
| CoO | 0–0.1 |
| NiO | 0.15–0.27 |
| CuO | 0–0.1 |
| Er$_2$O$_3$ | 0–0.25 |
| V$_2$O$_5$ | 0–0.05 |
| Cr$_2$O$_3$ | 0–0.01. |

17. A colored sunglass lens having low UV transmissions consisting essentially of a glass of claim 16.

18. A sunglass combination comprising a sunglass frame and a sunglass lens of claim 17.

19. A glass of claim 1 of the following approximate composition:

| Oxide | Wt. % |
|---|---|
| SiO$_2$ | 57.8 |
| B$_2$O$_3$ | 1.5 |
| Al$_2$O$_3$ | 1.3 |
| Li$_2$O | 2.4 |
| Na$_2$O | 9.7 |
| K$_2$O | 2.4 |
| TiO$_2$ | 8.5 |
| CeO$_2$ | 2.8 |
| Nd$_2$O$_3$ | 12.1 |
| Fe$_2$O$_3$ | 1.6 |
| CoO | 0.04 |
| NiO | 0.04 |
| CuO | 0.04 | as melted in the presence of about 2 wt. % KHF$_2$ refining agent.

20. A glass composition consisting essentially of

| Oxide | Wt. % |
|---|---|
| SiO$_2$ | 40–72 |
| B$_2$O$_3$ | 0–13 |
| Al$_2$O$_3$ | 0.5–3 |
| Li$_2$O | 0–3 |
| Na$_2$O | 8–13 |
| K$_2$O | 1–10 |
| TiO$_2$ | 8.0–9.5 |
| CeO$_2$ | 2.6–3.5 |
| Nd$_2$O$_3$ | 5–17 |
| Fe$_2$O$_3$ | 1.40–2.10 |
| CoO | 0–0.07 |
| NiO | 0–0.4 |
| CuO | 0–0.5 |
| Er$_2$O$_3$ | 0–2 |
| V$_2$O$_5$ | 0–0.5 |
| Cr$_2$O$_3$ | 0–0.25 | and having the following properties
% T (2.0 mm) 400 nm: ≦2.2%
% T (2.0 mm) 380 nm: 0.0%, and
a: −1.0 to −7.5
b: +1.0 to +10.0
with the proviso that said glass composition is not of the following approximate composition:

| | |
|---|---|
| SiO$_2$ | 57.8 |
| B$_2$O$_3$ | 1.5 |
| Al$_2$O$_3$ | 1.3 |
| Li$_2$O | 2.4 |
| Na$_2$O | 9.7 |
| K$_2$O | 2.4 |
| TiO$_2$ | 8.5 |
| CeO$_2$ | 2.8 |
| Nd$_2$O$_3$ | 12.1 |
| Fe$_2$O$_3$ | 1.6 |
| CoO | 0.04 |
| NiO | 0.04 |
| CuO | 0.04 | as melted in the presence of about 2 wt. % KHF$_2$ refining agent.

* * * * *